United States Patent [19]

Moisson et al.

[11] Patent Number: 4,472,222
[45] Date of Patent: Sep. 18, 1984

[54] RECOVERABLE CLOSURE ASSEMBLY

[75] Inventors: Mark F. L. Moisson, Humbeek; Joris R. I. Franckx, Bonheiden, both of Belgium

[73] Assignee: N. V. Raychem S. A., Belgium

[21] Appl. No.: 401,177

[22] Filed: Jul. 23, 1982

Related U.S. Application Data

[63] Continuation of Ser. No. 228,349, Jan. 26, 1981, abandoned.

[30] Foreign Application Priority Data

Feb. 8, 1980 [GB] United Kingdom ............... 8004287
Jun. 2, 1980 [GB] United Kingdom ............... 8018029
Dec. 15, 1980 [GB] United Kingdom ............... 8040100

[51] Int. Cl.³ .................. B29C 27/00; H01R 4/00; H02G 13/06
[52] U.S. Cl. ................................ 156/86; 174/92; 174/DIG. 8; 156/49; 264/230; 428/36
[58] Field of Search ............... 174/92, 84 R, DIG. 8; 428/36; 264/230; 156/49, 85, 86

[56] References Cited

U.S. PATENT DOCUMENTS

| 2,027,962 | 1/1936 | Currie ................. 174/DIG. 8 |
| 3,086,242 | 4/1963 | Cook et al. . |
| 3,159,513 | 12/1964 | Bayer ................. 174/DIG. 8 |
| 3,770,556 | 11/1973 | Evans et al. ........... 174/DIG. 8 |
| 3,879,574 | 4/1975 | Filreis et al. ........... 174/92 |
| 3,899,807 | 8/1975 | Sovish et al. . |
| 3,957,382 | 5/1976 | Gruel, Jr. et al. ........ 403/27 |
| 4,029,895 | 6/1977 | Scarborough ........... 174/84 R |
| 4,142,592 | 3/1979 | Brusselmans ............ 174/DIG. 8 |
| 4,181,775 | 1/1980 | Corke ................. 428/348 |
| 4,282,397 | 8/1981 | Siedenburg et al. ........ 174/92 |
| 4,304,616 | 12/1981 | Richardson . |
| 4,380,686 | 4/1983 | Moisson .............. 174/84 R |

FOREIGN PATENT DOCUMENTS

| 0025691 | 3/1981 | European Pat. Off. . |
| 1490689 | 6/1969 | Fed. Rep. of Germany . |
| 1947057 | 3/1970 | Fed. Rep. of Germany . |
| 7805026 | 8/1978 | Fed. Rep. of Germany . |
| 2807154 | 11/1979 | Fed. Rep. of Germany . |
| 1065431 | 4/1967 | United Kingdom . |
| 1155470 | 6/1969 | United Kingdom . |
| 1376038 | 12/1974 | United Kingdom . |
| 1440524 | 6/1976 | United Kingdom . |
| 1586388 | 3/1981 | United Kingdom . |

Primary Examiner—William R. Dixon, Jr.
Attorney, Agent, or Firm—Herbert G. Burkard; T. Gene Dillahunty; Dennis E. Kovach

[57] ABSTRACT

An assembly for sealing and protection of cable splices comprising a recoverable, preferably heat-recoverable outer sleeve 5 surrounding a cable or other body 1; a thermoplastic support layer 7 surrounding the body 1 and within the sleeve 5; and a heat barrier layer, preferably foamed, between the support 7 and the sleeve 5, to prevent thermal deformation of the support 7 during heat recovery of the sleeve or during other heat treatment 5.

26 Claims, 9 Drawing Figures

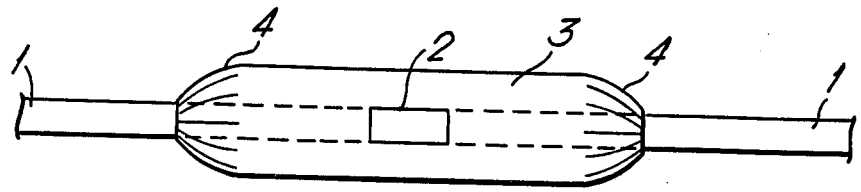
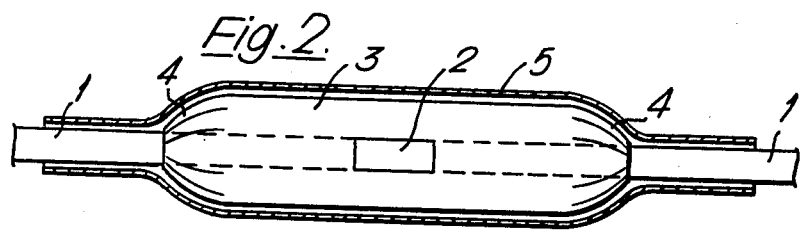
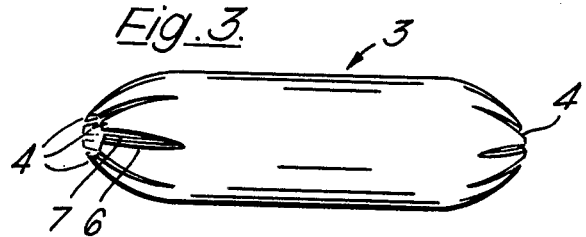
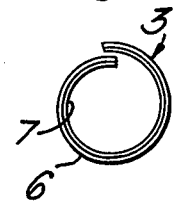
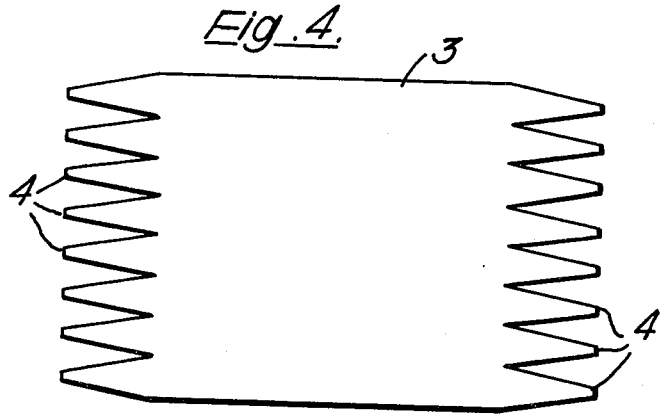
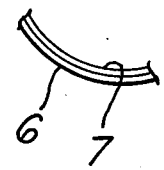

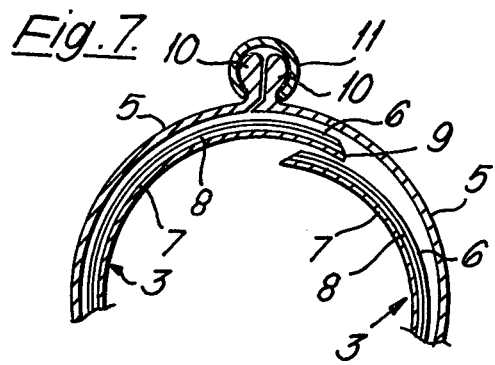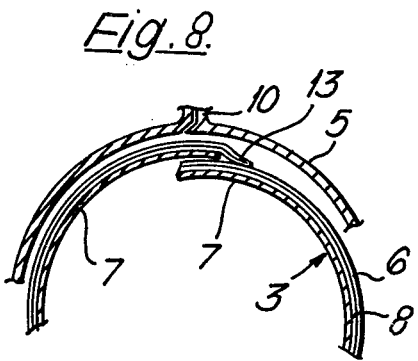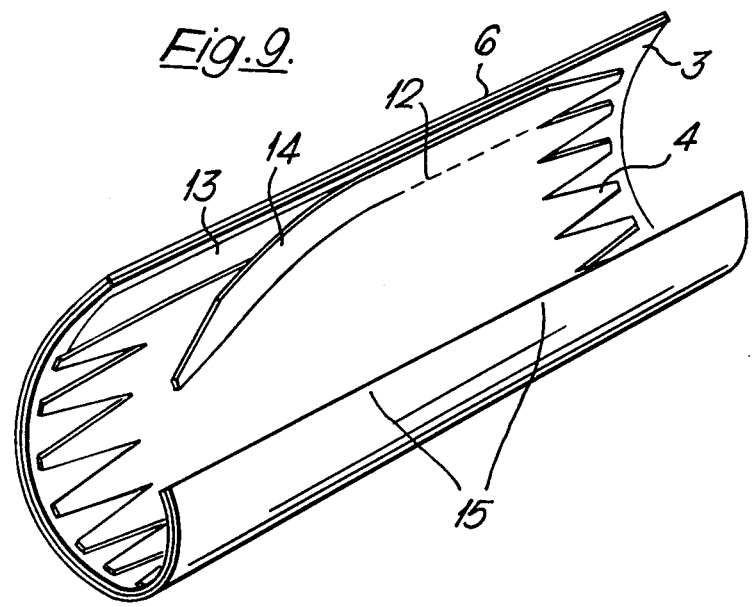

RECOVERABLE CLOSURE ASSEMBLY

This application is a continuation, of application Ser. No. 228,349, filed 1/26/81 now abandoned.

This invention relates to a recoverable closure assembly, a method of enclosing a body in such an assembly, and component parts for such an assembly.

Recoverable closure assemblies have a wide variety of uses, one important use being the enclosure and protection of cable splices by means of a recoverable outer sleeve which is shrunk around the cable splice to provide a protective enclosure for the splice. Recoverable articles are, in general, articles whose dimensional configuration may be made substantially to change when subjected to an appropriate treatment. Of particular interest here are heat-recoverable articles, the dimensional configuration of which may be made substantially to change when subjected to heat treatment. Heat-recoverable articles may be produced by deforming a material having a dimensionally heat-stable configuration on the application of heat alone. As is made clear in U.S. Pat. No. 2,027,962, however, the original dimensionally heat-stable configuration may be a transient form in a continuous process in which, for example, an extruded tube is expanded, whilst hot, to a dimensionally heat-unstable form. Alternatively a preformed dimensionally heat-stable article may be deformed to a dimensionally heat-unstable form in a separate stage. In the production of dimensionally recoverable articles, the composition may also be cross-linked at any stage in the production process that will accomplish the desired additional dimensional recoverability.

The present invention can also be relevant to recoverable sleeves whose recoverability results from mechanical resistance to change rather than from kinetic stability. In such cases the recoverable sleeve may return to its stable state on removal, destruction, or melting of an additional hold-out agent, such as a further sleeve within the recoverable sleeve.

Various other components may be included in a closure assembly, and for example there may be provided between a cable splice and the recoverable sleeve a liner to achieve, for example, a moisture barrier or a physical support for the sleeve. One particularly useful form of liner, which is capable of being wrapped around such a splice prior to recovery of the sleeve, is described in commonly assigned copending U.S. application Ser. No. 94,815. Alternatively, a liner and recoverable sleeve may be provided as an integral laminate.

It is possible, however, that such a liner may be expensive in certain circumstances, particularly when total physical support is required for heat-recoverable sleeves of large diameter. We have now devised an alternative closure assembly which can combine high flexibility at installation, and high static and impact load resistance.

Thus, the present invention provides a recoverable closure assembly, comprising a recoverable outer sleeve which can surround a body to be enclosed thereby, and a liner which can surround the body within the sleeve; the liner comprising an internal thermoplastic support layer and an external heat barrier layer.

The outer sleeve is preferably heat-recoverable, in which case the heat barrier layer would be capable of preventing thermal deformation of the support layer during heat-recovery of the sleeve. Where the outer sleeve is recoverable by means other than heat, the heat barrier layer will simply be capable of providing heat resistance sufficient for whatever conditions the assembly will be subjected to. The liner preferably includes a substantially vapour impermeable moisture barrier, and each layer of the liner is preferably substantially incapable of capillary transfer of liquid. The moisture barrier may be an additional layer, or the function of preventing ingress of moisture may be carried out by one of the existing layers.

The invention also provides a liner suitable for use in the assembly of the invention, and we prefer that the layers of the liner are bonded together to form a laminate.

The invention further provides a method of enclosing a body, such as a cable splice, which comprises positioning about the body a liner and a recoverable sleeve as defined above, and effecting recovery of the sleeve. Where the liner and sleeve are not or the liner is not a bonded laminate, the various layers may be placed around the body separately in the desired order, or all at once if desired.

The invention still further provides in a kit-of-parts for making the assembly.

It can be seen, therefore, that the desirable properties of a liner can be achieved by using a support layer which has the required strength and flexibility and can resist the force of the outer sleeve during recovery; any lack of heat-resistance of the support layer can therefore be compensated for by provision of a heat barrier layer.

The liner of the new assembly can be resistant to delamination of its layers, and can resist ingress of water by capillary transfer (wicking), which could otherwise allow water or other moisture to by-pass via the ends of the liner any moisture-barrier layer that may be provided.

The idea of using as the support layer a material which is itself thermoplastic allows great freedom of choice for this material, whilst thermal deformation of the thermoplastic support layer during recovery of the outer sleeve can be substantially avoided by means of a foamed heat barrier layer. Also, thermoplastic material is relatively inexpensive and is easy to shape by moulding, extrusion or other thermoforming process, which means that the support layers can readily be provided in any form. The length of a piece of support layer is not critical, but it should not be so long that collapse occurs when the sleeve is recovered. Strength can be increased by overlap using, say, 2 or 3 rolls of support. Alternatively the material thickness can be increased.

The material of the support layer will be chosen bearing in mind the desired strength and any heat that it may have to resist, for example during and after heat recovery of the sleeve. A preferred material for the support layer is an olefinic polymer such as calcium carbonate-filled polypropylene, but other suitable thermoplastics may be used, such as high density polyethylene or polycarbonate. Desirable properties of the support layer include resistance to low-temperature impact, a deflection temperature high enough that collapse under stress is avoided, and a suitable flexural modulus. A suitable deflection temperature at 264 p.s.i. is from 55°–65° C., preferably about 62° C. A suitable impact strength at 23° C. is 6–10, preferably about 8 ft lb/in and at 18° C. is 0.8–12, preferably about 1 ft lb/in. A skilled man, knowing these requirements, would be able to select a suitable material.

The invention is particularly suitable for dealing with cable splice enclosures having a diameter greater than 100 especially greater than 126 mm, and a length of 250-300 preferably about 300 mm, which are approximately the upper size limits of satisfactory operation using the cable sleeve liner described in our aforementioned copending Application. Filled polypropylene sheet is preferred as the support layer of the present invention because of its high strength, its high melting point (160° C.) and its good flexibility at room temperature. It is known that installation temperatures can exceed 160° C. in the vicinity of the liner, but the heat barrier layer of the present invention can be used as aforesaid to minimise any difficulties in this respect.

The filled polypropylene sheet is preferably 0.8 to 1.2 mm in thickness, and need not necessarily have exactly the same dimensions as the heat barrier layer. A well chosen support layer can prevent any collapse or deformation during recovery of the heat-shrinkable sleeve, while providing the strength and flexibility to prevent the system from being permanently damaged when subjected to mechanical load and/or impact. The present invention is expected to be usable or adaptable for cable splice enclosures having diameters up to at least 200 mm.

The heat barrier layer is preferably non thermoplastic, for example a closed cell foam to minimise moisture penetration (say 0.03-0.05 particularly about 0.04 lb/ft$^3$), and may be any foam capable of withstanding operating temperatures encountered in use, i.e. at least 140, particularly above 160° C. A suitable thermal conductivity of a foam is 0.3-0.35 preferably 0.32 BTU/hr sq ft ° F. per inch. The foam is preferably flexible, although relatively rigid foams could be used if suitable folding lines are scored therein or if other means are provided to assist their being wrapped around the body to be enclosed. Most closed cell non moisture absorbent foams having the requisite heat stability appear to be suitable, neoprene or polyolefins being currently preferred. Cross-linking may be carried out, and it gives additional heat stability and will be advantageous in some cases. One suitable method of cross-linking is by irradiation. Two or more layers of such heat barrier material may be used between the support layer and the sleeve. When we refer to a foamed material we simply mean materials containing many holes throughout its bulk: we do not intend to be limited to a method of production. The thickness of the foam, and the size and distribution of the holes can be chosen according to the particular use for which the product is intended. The heat transfer rate during any heat recovery will be one consideration, and a satisfactory value will depend on the susceptibility to damage of the support layer and on the efficiency of the heat barrier layer.

A preferred thickness of the foam layer is 0.8 mm but slightly thicker or thinner foam will be suitable. The density of the cells is preferably such as to give an overall density of 90-110 more preferably 100 Kg/m$^3$.

Alternatively, the heat barrier layer may comprise a non-woven cellulosic material, and may be for example one of more layers of press board.

A substantially vapour-impermeable moisture barrier layer is preferably included in the assembly, usefully between the foamed heat barrier layer and the support layer. The moisture barrier layer, preferably a flexible metallic layer, such as aluminium, may be positioned elsewhere in the assembly if desired, for example on the exterior surface of the foam, between the outer sleeve and the foamed layer, or incorporated in the sleeve itself, preferably on the inner surface thereof, which then may receive the usual adhesive or mastic coatings for sealing the enclosure. The thickness of the aluminium or other metal should be such that it is not destroyed when the assembly is produced. A thickness of 10-30 preferably 12-25 more preferably 15 microns is preferred.

The support layer may itself be laminated to the foamed heat barrier layer or to the moisture barrier/heat barrier laminate, or may be provided as a separate component. We prefer that the support layer is bonded to the heat barrier layer and to any other layer present, to form a laminated support liner. Suitable bonding procedures and adhesives, pressure-sensitive or otherwise, may readily be selected by persons familiar with such technology. Heat activated adhesive may be used, and of these polyamides are preferred—see U.S. Pat. No. 4,181,775 which describes suitable adhesives the disclosure of which is incorporated herein by reference.

Where the support layer is part of a laminated support liner with (at least) one other layer, it may be desirable that a longitudinal strip at one edge of the support layer can be removed to expose a strip of the other layer: this exposed edge strip forms a tab which can be used for bonding to the opposite edge or other portion of the liner to hold the liner in a substantially cylindrical or other configuration around a body to be protected. Preferred ways to provide for removal of such a strip include provision of a line of weakness along the length of the support layer at a suitable distance from one edge or provision of an indentation at one side of the layer by means of which a strip can be gripped for tearing. A series of such lines of weakness may be provided to allow a single design of liner to be used to protect bodies of various thickness. Such lines can be identical to or additional to lines provided to aid curving of an originally flat liner around the body. The tab can have the additional or alternate function of protecting the outer sleeve from the generally sharp edge of the support layer which may otherwise be prominent at the point of overlap of the support layer. Conveniently, the laminated support liner that we are referring to here is produced on a continuous line using a pressure-sensitive adhesive. Such adhesive allows easy removal of the support layer strip to leave a pressure-sensitive tab. This laminated support liner is preferably a three part laminate of support (preferably polypropylene), heat barrier (preferably foam) and moisture barrier (preferably aluminium sheet), which would produce on removal of the strip of support layer a foam-aluminium adhesive tab.

Each end of the liner may taper gradually to the diameter of the body which it surrounds, the advantages of this are good seals at the end of the liner and reduction in the number of sharp points or edges which could damage the outer sleeve. The tapered ends of the liner are preferably produced by providing longitudinal slits into the ends of the support layer, which allow the ends of the liner to close down into cone shapes. It is desirable that the slits are produced by removing tapered portions of material from the support layer, to define a series of oppositely tapered fingers; such an arrangement would allow the conical ends to be formed without gaps.

An embodiment of the present invention is shown by way of example in the accompanying drawings, wherein FIGS. 1 and 2 show a closure assembly according to the present invention respectively before and after recovery of the outer sleeve;

FIGS. 3 and 4 show a support member according to the present invention as used in the assembly of FIGS. 1 and 2;

FIGS. 5 and 6 show the support member structure in more detail as viewed from an edge of the support member;

FIGS. 7 and 8 show, in part section, an outer sleeve and an inner sleeve liner; and FIG. 9 shows a sleeve liner in perspective view.

In FIGS. 1 and 2, a cable 1 is shown joined by known means such as a crimped ferrule 2 and a support liner 3 is placed around the joint. The liner has slit end portions forming tapered fingers 4 which can be deformed inwards to form a tapering transition from the liner 3 to the cable 1.

A heat recoverable sleeve 5 surrounds the liner and extends beyond its ends so as to seal the assembly after heat recovery of the sleeve, as shown in FIG. 2, the sleeve normally carrying an internal coating of heat activatable adhesive to ensure moisture-proof sealing.

The tapered fingers 4 of the liner 3 can be seen more clearly in FIGS. 3 and 4, FIG. 3 also showing the foamed polymeric heat barrier layer 6 carried in this example as a laminate on substantially the whole outside surface of the liner 3. The calcium carbonate-filled polypropylene support layer 7 of the liner is also shown in FIG. 3, the liner being shown in perspective in the configuration assumed when it is wrapped around the cable 1 with the tapered fingers 4 bent inwards towards the cable. Since the fingers preferably are formed only by the support layer, a continuous web of moisture barrier may be provided. This feature, combined with the inwardly bent ends provides a good seal and is described and claimed in U.S. application Ser. No. 155,817 now abandoned.

The laminated structure of the liner in this example is also illustrated in the edge view of FIG. 5 and the magnified detail of FIG. 6, using the same references 6 and 7 for the foam and polypropylene layers.

Lamination can be affected by any convenient means such as adhesive, and this applies also to liners which incorporate in the laminate a further layer of flexible moisture impermeable material (not shown), preferably a metallic film such as aluminium, either between the foam and polypropylene, or elsewhere in the liner.

FIGS. 7 and 8 show part of a sleeve liner 3 inside a heat recoverable outer sleeve 5. The outer sleeve 5 includes joining rails 10 and a closure member 11 which holds the rails in an abutting position. Such a sleeve is described and claimed in British Pat. No. 1155470. The sleeve liner consists of a support layer 7, a moisture barrier 8 and a heat barrier 6 bonded together with a contact adhesive. From FIG. 7 it can be seen that where the sleeve liner 3 overlaps a hard edge 9 of the support layer, this edge can in some circumstances press against the outer sleeve 5. In FIG. 8 a strip of the support layer 7 has been removed to leave a tab 13 which makes the overlap more gentle, and thereby minimises risk of sleeve splitting on recovery. This tab 13 may also be used to bond to a portion of the support layer to hold the liner in the correct configuration around the body to be protected.

FIG. 9 shows a partly rolled sleeve liner 3. A line of weakness 12 is provided for removal of a strip of support layer 14 to expose a tab 13 of, in the illustrated embodiment, a moisture barrier—heat barrier laminate. This tab will preferably carry a contact adhesive for bonding to the portion of the sleeve liner marked 15.

The tapered fingers 4 are preferably as shown in FIGS. 3 and 4, but simple straight slits or other configurations could be provided in the support layer if desired to permit tapering of the liner onto the cable.

In order to give additional flexibility to the part of the support layers which bend to form the tapering transitions from the liner 3 to the cable 1, holes may be formed in the layers at the base of each finger. These holes can also prevent or reduce points or sharp edges from occurring around the junction between the central position of the rolled sleeve and each tapered end. These holes preferably penetrate only the support layer 7, and not any heat or moisture barriers which may be attached.

In use, the components of the assembly are positioned about the body to be enclosed in the following order from the body surface: support layer, heat barrier layer and sleeve. Heat is then applied to effect recovery of the sleeve about the body. Preferably, the moisture barrier layer is also positioned about the body, most preferably between the heat barrier layer and the exterior of the assembly or sandwiched between the heat barrier layer and the support layer. The support layer and the barriers may, of course, be provided as an integral laminate.

The heat-recoverable sleeve may be any known suitable sleeve, either of the 'tubular' or 'wrap-around' kind, for example using elastic memory as described in U.S. Pat. Nos. 3,086,242; 3,957,382 and 2,027,962, or using elastomeric recovery after a support holding the sleeve in a stretched state is softened by heating, as described in British Pat. No. 1,440,524.

We claim:

1. A heat-recoverable closure assembly, comprising a heat-recoverable outer sleeve which surrounds a body to be enclosed thereby, and a liner which surrounds the body within the sleeve; the liner comprising in use an internal thermoplastic support layer and an external heat barrier layer being of low thermal conductivity, wherein each of said layers is substantially incapable of capillary transfer of liquid and the heat stability of the support layer and the heat transfer rate of the heat barrier layer are such that for the time and temperature required by recovery of the sleeve, the support layer substantially retains its strength.

2. An assembly according to claim 1, in which the heat barrier layer is laminated to the support layer.

3. An assembly according to claim 1, in which the support layer comprises an olefinic polymer.

4. An assembly according to claim 3, in which the support layer is a calcium-carbonate filled polypropylene.

5. An assembly according to claim 1, in which the heat barrier layer comprises a foamed polymeric material.

6. An assembly according to claim 5, in which the foamed polymeric material is a substantially closed cell material.

7. An assembly according to claim 5 or 6, in which the heat barrier layer comprises a cross-linked neoprene foam.

8. An assembly according to claim 5 or 6, in which the heat barrier layer comprises a cross-liked polyolefin foam.

9. A liner for use in an assembly according to claim 1, comprising a support layer bonded to another layer, the support layer having a line of weakness or indentation by means of which a longitudinal strip of the support layer can be removed to expose a tab of the other layer which can bond to a portion of the liner to hold the liner around a body.

10. A liner for use in an assembly according to claim 1, comprising a support layer bonded to another layer, the support layer having a line of weakness or indentation by means of which a longitudinal strip of the support layer can be removed to expose a tab of the other layer which can provide a covering for the resulting exposed edge of the support layer.

11. An assembly according to claim 1 in which the support layer has longitudinal lines of weakness which aid curvature of the liner around the body.

12. An assembly according to claim 1, in which the liner, in use, has tapered end portions produced by bending inwardly tongues defined by adjacent longitudinal slits which extend into the end of the support layer.

13. An assembly according to claim 12, in which the support layer has an enlarged hole at the closed end of each slit.

14. A kit of parts comprising a recoverable sleeve and a liner comprising in use an internal thermoplastic support layer and an external heat barrier layer being of low thermal conductivity, wherein each of said layers is substantially incapable of capillary transfer of liquid and the heat rate of the heat barrier layer are such that for the time and temperature required by recovery of the sleeve, the support layer substantially retains its strength.

15. A kit of parts according to claim 14, which additionally comprises a moisture barrier layer for use in conjunction with said liner.

16. A recoverable closure assembly, comprising a heat recoverable outer sleeve which can surround a body to be enclosed thereby, and a liner which can surround the body within the sleeve and acts as a support for the sleeve after recovery; the liner comprising in use an internal calcium-carbonate filled polypropylene support layer bonded to an external heat barrier layer being of low thermal conductivity and comprising a closed cell cross-linked foamed polyolefin, the heat barrier layer being capable in use of preventing thermal deformation of the support layer during heat recovery of the sleeve.

17. An assembly according to claim 1 or 16, in which the heat barrier layer or another layer overlaps the support layer along a longitudinal edge thereof to form a tab which, when the liner is in use, bonds to a portion of the liner to hold the liner around the body.

18. An assembly according to claim 1 or 16, in which the heat barrier layer or another layer overlaps the support layer along a longitudinal edge thereof to form a tab which, when the liner is in use, provides a barrier between said edge and the outer sleeve.

19. An assembly according to claim 18, in which the overlap is produced by removal of a longitudinal strip of support layer from a bonded laminate of support layer and heat barrier or other layer.

20. An assembly according to claim 19, in which the heat barrier or other layer, as the case may be, is bonded to the support layer by a pressure sensitive adhesive, such that removal of the strip results in a pressure sensitive adhesive tab.

21. An assembly according to claim 1 or 16, in which the liner additionally comprises a substantially vapour impermeable moisture barrier layer.

22. An assembly according to claim 21, in which the support layer, the heat barrier layer and the moisture barrier layer are bonded together.

23. An assembly according to claim 21, in which the moisture barrier layer comprises a foil.

24. An assembly according to claim 23, in which the foil is an aluminum foil.

25. A cable splice enclosed in an assembly according to claim 16.

26. A method of enclosing a body comprising the steps of:
(a) positioning about the body a liner comprising in use an internal thermoplastic support layer and an external heat barrier layer being of low thermal conductivity, wherein each of said layers is substantially incapable of capillary transfer of liquid and the heat stability of the support layer and the heat transfer rate of the heat barrier layer are such that for the time and temperature required by recovery of the sleeve, the support layer substantially retains its strength;
(b) positioning about the liner a heat-recoverable outer sleeve; and
(c) recovering the sleeve.

* * * * *